(12) United States Patent
Saeki et al.

(10) Patent No.: US 9,507,207 B2
(45) Date of Patent: Nov. 29, 2016

(54) DISPLAY DEVICE

(71) Applicant: Japan Display Inc., Tokyo (JP)

(72) Inventors: Yoshifumi Saeki, Tokyo (JP); Noriyoshi Kanda, Tokyo (JP)

(73) Assignee: Japan Display Inc., Tokyo (JP)

( * ) Notice: Subject to any disclaimer, the term of this patent is extended or adjusted under 35 U.S.C. 154(b) by 58 days.

(21) Appl. No.: 14/573,094

(22) Filed: Dec. 17, 2014

(65) Prior Publication Data

US 2015/0168764 A1    Jun. 18, 2015

(30) Foreign Application Priority Data

Dec. 18, 2013   (JP) ................................. 2013-261062

(51) Int. Cl.
| | | |
|---|---|---|
| *G02F 1/1339* | (2006.01) | |
| *G02F 1/1337* | (2006.01) | |
| *G02F 1/1335* | (2006.01) | |
| *G02F 1/1333* | (2006.01) | |

(52) U.S. Cl.
CPC ............ *G02F 1/1337* (2013.01); *G02F 1/1339* (2013.01); *G02F 1/133512* (2013.01); *G02F 1/133784* (2013.01); *G02F 2001/133357* (2013.01)

(58) Field of Classification Search
CPC .. G02F 1/1339; G02F 1/1341; G02F 1/1345; G02F 1/133351; G02F 1/13394; G02F 2001/13415; G02F 1/1337; G02F 1/133711; G02F 1/134363; G02F 1/133788; G02F 1/133753
USPC .................................. 349/153, 190, 123, 124
See application file for complete search history.

(56) References Cited

U.S. PATENT DOCUMENTS

| | | | | |
|---|---|---|---|---|
| 2001/0033356 | A1* | 10/2001 | Yanagawa ............. | G02F 1/1339 349/153 |
| 2015/0346535 | A1* | 12/2015 | Moriwaki ......... | G02F 1/133345 349/43 |
| 2016/0041413 | A1* | 2/2016 | Nishino ................ | G02F 1/1339 349/42 |

FOREIGN PATENT DOCUMENTS

| | | |
|---|---|---|
| JP | 2005-326446 A | 11/2005 |
| JP | 2008-15254 A | 1/2008 |

* cited by examiner

*Primary Examiner* — Mike Qi
(74) *Attorney, Agent, or Firm* — Typha IP LLC

(57) ABSTRACT

When an alignment film is applied to the whole surface of a substrate, adhesion intensity between a sealing material and the alignment film is further deteriorated. A display device includes an array substrate having a first alignment film, a counter substrate having a second alignment film, a liquid crystal layer in contact with the first alignment film and the second alignment film, and a sealing material for bonding the first alignment film and the second alignment film together, wherein the sealing material is provided with a portion adapted to increase the area of the adhered portion.

9 Claims, 6 Drawing Sheets

DISPLAY DEVICE

CLAIM OF PRIORITY

The present application claims priority from Japanese patent application JP 2013-261062 filed on Dec. 18, 2013, the content of which is hereby incorporated by reference into this application.

BACKGROUND

The invention relates to a display device and can be applied, for example, to a display device having an alignment film.

In a liquid crystal display device, a TFT substrate (array substrate) where pixel electrodes and thin film transistors (TFT) are formed in a matrix shape and a CF substrate (counter substrate) where a color filter is provided opposite to the TFT substrate at a position corresponding to the pixel electrodes on the TFT substrate are provided, and a liquid crystal layer is interposed between the array substrate and the counter substrate and sealed by a sealing material. An alignment film is formed in the respective contact portions of the array substrate and the counter substrate with the liquid crystal layer.

In a sealing area where the array substrate and the counter substrate are bonded to each other by a sealing material, there is a problem that the sealing material has a poor adhesion with the alignment film. Taking the above into consideration, there is disclosed a liquid crystal display device in which the alignment film is not formed in the sealing area, in Japanese Patent Publication No. 2008-15254 (Patent Document 1).

SUMMARY

In the Japanese Patent Publication No. 2008-15254, the alignment film cannot be applied to the whole surface of a substrate, and therefore, a design and process control becomes hard according to the miniaturization of a fringe portion. When the alignment film is applied to the whole surface of the substrate, adhesion intensity between the sealing material and the alignment film is further deteriorated.

This disclosure is to provide a display device improved in the adhesion intensity between the sealing material and the alignment film.

Other problems and novel features will be apparent from the description of the disclosure and the accompanying drawings.

Of the disclosure, outline of the typical example will be described as follows.

Specifically, a display device includes an array substrate having a first alignment film, a counter substrate having a second alignment film, a liquid crystal layer in contact with the first alignment film and the second alignment film, and a sealing material for bonding the first alignment film and the second alignment film together, wherein the sealing material is provided with a portion adapted to increase the area of the adhered portion.

DESCRIPTION OF THE PREFERRED EMBODIMENTS

Hereinafter, one embodiment, example and modified example will be described with reference to the drawings. The disclosure is only one example, and various modifications which may be arrived at by those skilled in the art, without departing from the spirit of the invention, will be obviously included in the scope of the invention. In order to make the description clearer, the drawings schematically illustrate each component with respect to width, thickness, and shape, differently from the actual form, and the drawings are only an example and not to restrict the interpretation of the invention. In the specification and the drawings, the same reference codes are attached to the same elements that have been described in the previously mentioned drawing and their detailed description may be properly omitted.

A structure of a display device according to the embodiment will be described using FIGS. 1A and 1B.

Figure 1A:
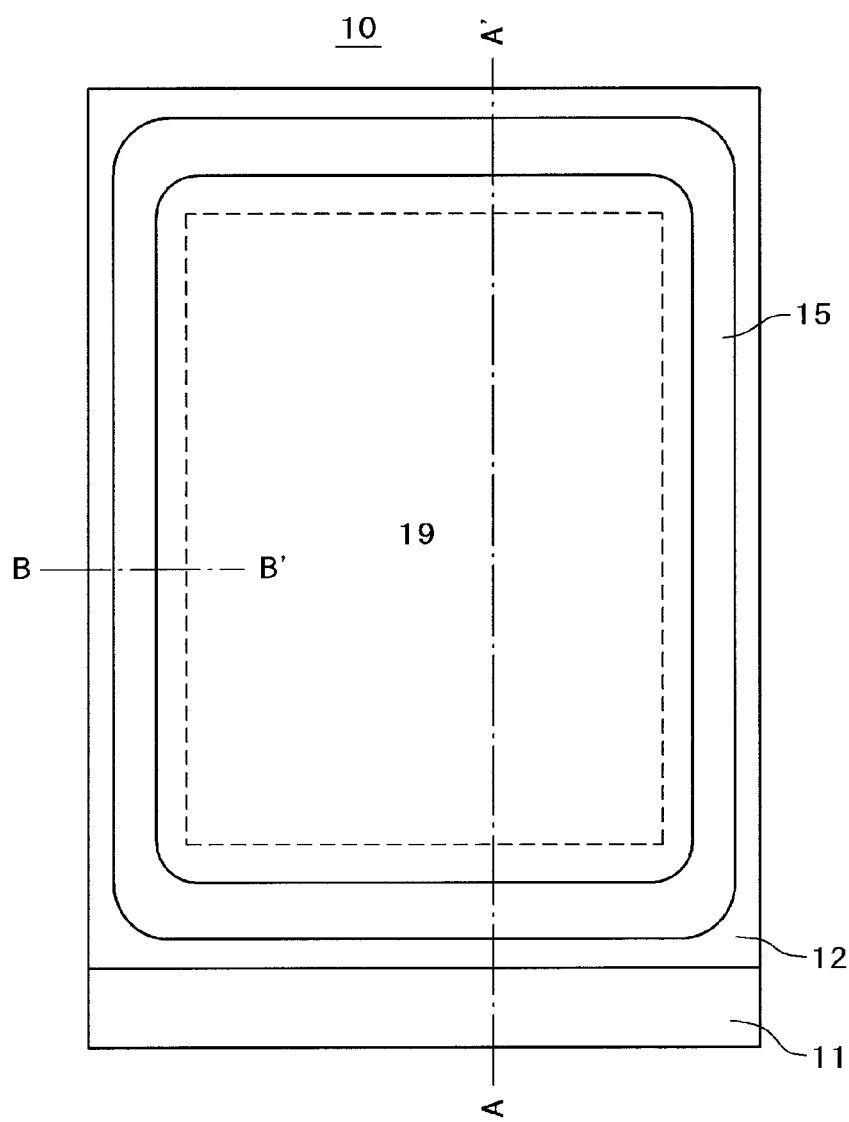
FIG. 1A is a plan view illustrating a structure of a display device according to an embodiment.
Figure 1B:
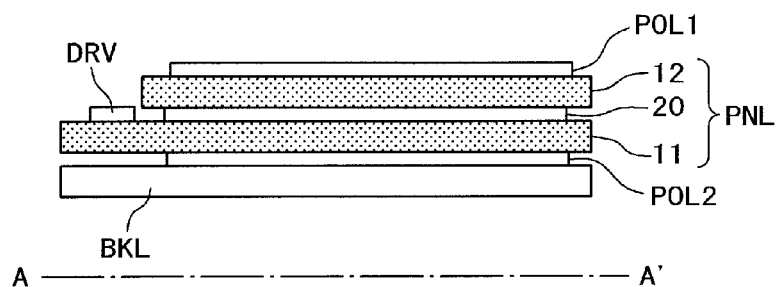
FIG. 1B is a plan view illustrating the structure of the display device according to the embodiment.

FIG. 1A is a plan view illustrating the structure of the display device according to the embodiment. FIG. 1B is a cross sectional view taken along the line A-A' in FIG. 1A. As illustrated in FIG. 1B, a display device 10 includes a display panel PNL, a semiconductor integrated circuit DRV, and a backlight BKL. The display panel PNL includes a TFT substrate (array substrate) 11, a liquid crystal layer 20, a CF substrate (counter substrate) 12, and polarizing plates POL1 and POL2. In an active area 19 of the array substrate 11, there are formed video signal lines and scanning lines activated by a semiconductor integrated circuit DRV, the pixel electrodes, and the thin film transistors (TFT). In the counter substrate 12, a color filter is formed at a position corresponding to the pixel electrodes of the TFT substrate 11. As illustrated in FIG. 1A, a sealing material 15 for bonding the array substrate 11 and the counter substrate 12 is provided outside the active area 19.

The plane structure and the cross sectional structure of the display device 10 illustrated in FIGS. 1A and 1B will be applied to a comparison example, example, and modified examples 1 and 2 described later.

COMPARISON EXAMPLE

Figure 2:
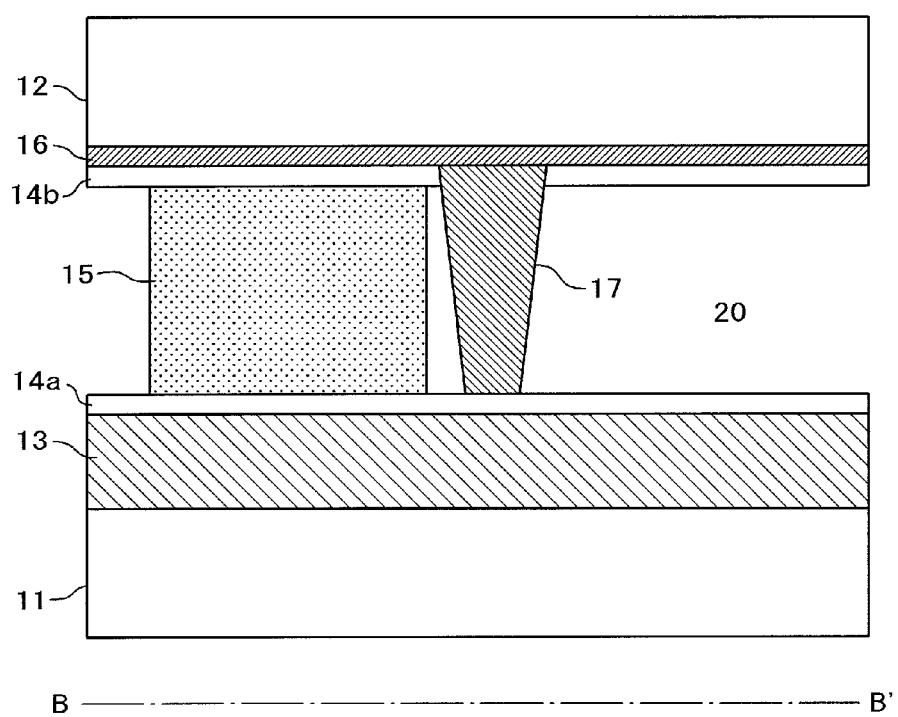
FIG. 2 is a cross sectional view illustrating a structure of a display panel according to a comparison example.

FIG. 2 is a cross sectional view illustrating a sealing area corresponding to the line A-A' indicated in FIG. 1, in a display panel according to a comparison example.

A display panel PNLR according to the comparison example includes the array substrate 11 and the counter substrate 12. A flattening film 13 and an alignment film 14a are formed on the array substrate 11. Further, a light shielding layer (BM) 16, an alignment film 14b, and a columnar spacer 17 made of resin are formed on the counter substrate 12. The columnar spacer 17 is also referred to as a photospacer, having a trapezoidal cross section, and arranged near the inside of the sealing material 15. The respective alignment films 14a and 14b of the array substrate 11 and the counter substrate 12 are bonded to each other by the sealing material 15, in order to interpose the liquid crystal layer 20 therebetween. When an ultraviolet ray for temporarily hardening the sealing material 15 is irradiated from the side of the array substrate 11, the alignment film 14a on the side of the array substrate 11 gets more fragile. When the alignment films 14a and 14b overlap with the sealing material 15 completely, the intensity of the display panel is deteriorated.

The display device according to the embodiment includes an array substrate having a first alignment film, a counter substrate having a second alignment film, a liquid crystal layer in contact with the first alignment film and the second alignment film, and a sealing material for bonding the first alignment film and the second alignment film together, wherein the sealing material is provided with a portion adapted to increase the area of the adhered portion.

EXAMPLE

A display panel according to an example will be described using FIG. 3.

Figure 3:
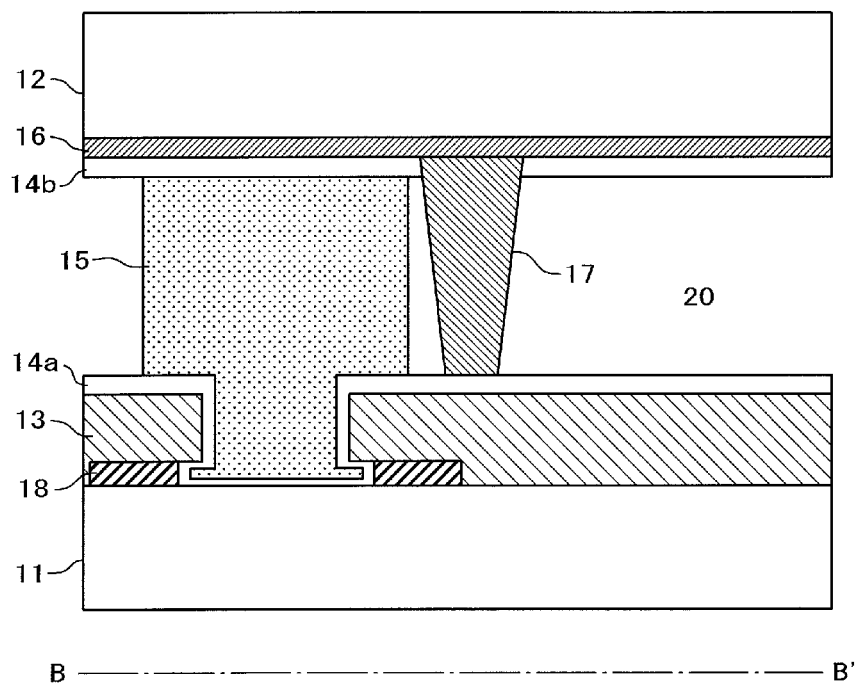
FIG. 3 is a cross sectional view illustrating a structure of a display panel according to an example.

FIG. 3 is a cross sectional view of the sealing area corresponding to the line B-B' indicated in FIG. 1A, in the display panel according to the example.

The display panel PNLA according to the example has the same structure as the comparison example, except for the structure on the side of the array substrate 11 positioned under the sealing material 15. The flattening film 13 and the alignment film (first alignment film) 14a are formed on the array substrate 11. The light shielding layer (BM) 16, the alignment film (second alignment film) 14b, and the columnar spacer 17 made of resin are formed on the counter substrate 12. The alignment film 14a and the alignment film 14b are subjected to rubbing processing or optical alignment processing. The columnar spacer 17 has a trapezoidal cross section and is arranged near the inside of the sealing material 15, to hold a space between the array substrate 11 and the counter substrate 12. The respective alignment films 14a and 14b of the array substrate 11 and the counter substrate 12 are bonded to each other by the sealing material 15 in order to interpose the liquid crystal layer 20 therebetween. The flattening film 13 is formed, for example, by an organic insulating layer.

As illustrated in FIG. 3, an inverted L shaped (hook-shaped) groove is formed in the flattening film 13 on the array substrate 11 positioned under the sealing material 15 in a facing way like a gate to have a convex portion. A groove (second groove) is also formed in the lower portion of the lateral surface of the groove (first groove) formed on the flattening film 13. The alignment film 14a is formed on the flattening film 13 and inside the groove of the flattening film 13. When the sealing material 15 is filled in the groove and hardened, the sealing material 15 becomes convex and by engaging the sealing material 15 in the flattening film 13 where the alignment film 14a is formed, the adhesion area of the sealing material 15 with the alignment film 14a on the side of the array substrate can be increased and the peel strength can be improved.

A method of manufacturing the display panel according to the example will be described with reference to FIGS. 4A to 4D.

Figure 4A:
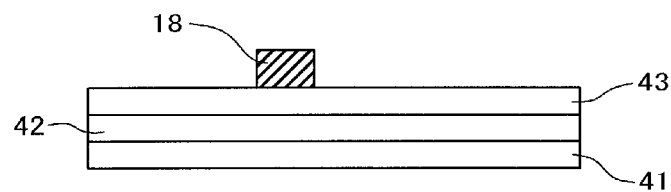
FIG. 4A is a cross sectional view illustrating a method of manufacturing the display panel according to the example.
Figure 4B:
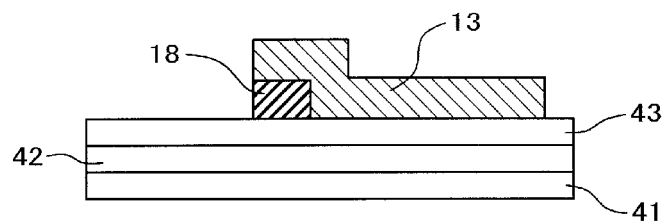
FIG. 4B is a cross sectional view illustrating the method of manufacturing the display panel according to the example.
Figure 4C:
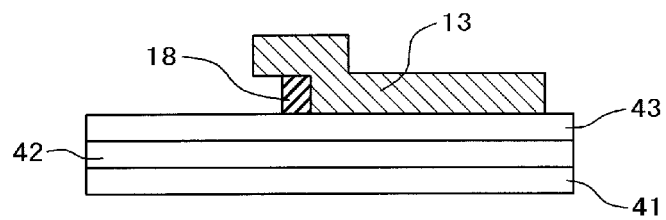
FIG. 4C is a cross sectional view illustrating the method of manufacturing the display panel according to the example.
Figure 4D:
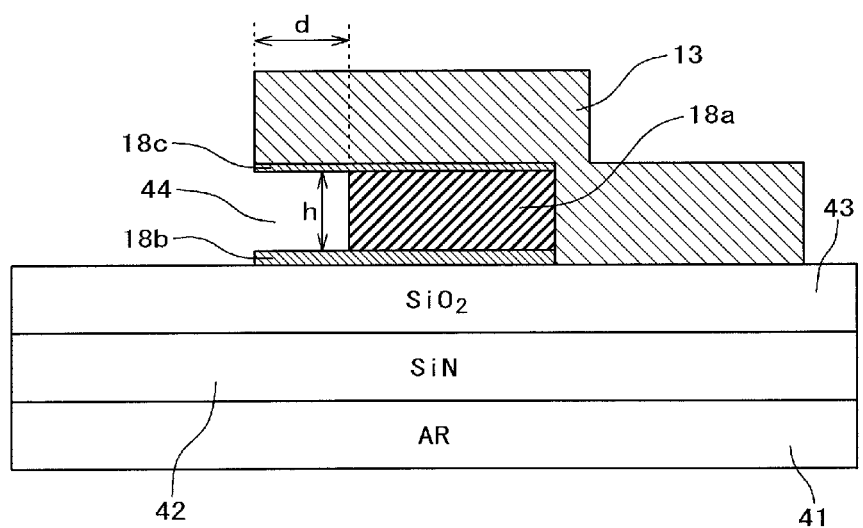
FIG. 4D is a cross sectional view enlarging FIG. 4C.

FIGS. 4A to 4C are a cross sectional view illustrating the method of manufacturing the display panel according to the example. FIG. 4D is a cross sectional view enlarging FIG. 4C.

As illustrated in FIG. 4A, a silicon nitride film (SiN) 42 and a silicon oxide film ($SiO_2$) 43 are formed on a glass substrate 41. A TAT (Ti/TiN/Al/Ti) film 18 is formed in a pattern on the silicon oxide film ($SiO_2$) 43. The TAT film 18 is formed of an Al film 18a, a Ti film 18b, and a Ti/TiN film 18c. The TAT film 18 can be formed simultaneously with the source line.

As illustrated in FIG. 4B, the flattening film 13 is formed in a pattern on the TAT film 18.

As illustrated in FIGS. 4C and 4D, the Al film 18a is removed from the TAT film 18 according to the wet etching. A groove 44 interposed between the Ti film 18b and the Ti/TiN film 18c is formed under the flattening film 13. When the length of the groove 44 in a horizontal direction is defined as d and the height of the groove 44 is defined as h, d is about h/2 to h. The h is the thickness (some hundred nm) of the Al film 18a.

Since the process of manufacturing the display panel according to the comparison example can be used for the process illustrated in FIGS. 4A, 4B, 4C, and 4D, there is no need to add another process.

Further, since the groove 44 is surrounded by the Ti film 18b, Ti/TiN film 18c, and Al film 18a that are a light shielding film, the alignment film 14a to be filled in the groove 44 is not exposed to the ultraviolet ray (UV light) in temporarily hardening the sealing material 15; therefore, the intensity of the alignment film can be kept.

Further, since the alignment film 14a can be applied to the whole surface of the array substrate 11, there is no need to make a place where the alignment film 14a is not formed, in the whole area or a part of the sealing material 15, which can make the manufacturing easy, hence to cope with the miniaturization of the fringe portion.

MODIFIED EXAMPLE 1

A modified example (modified example 1) of the display panel according to the example will be described using FIG. 5.

Figure 5:
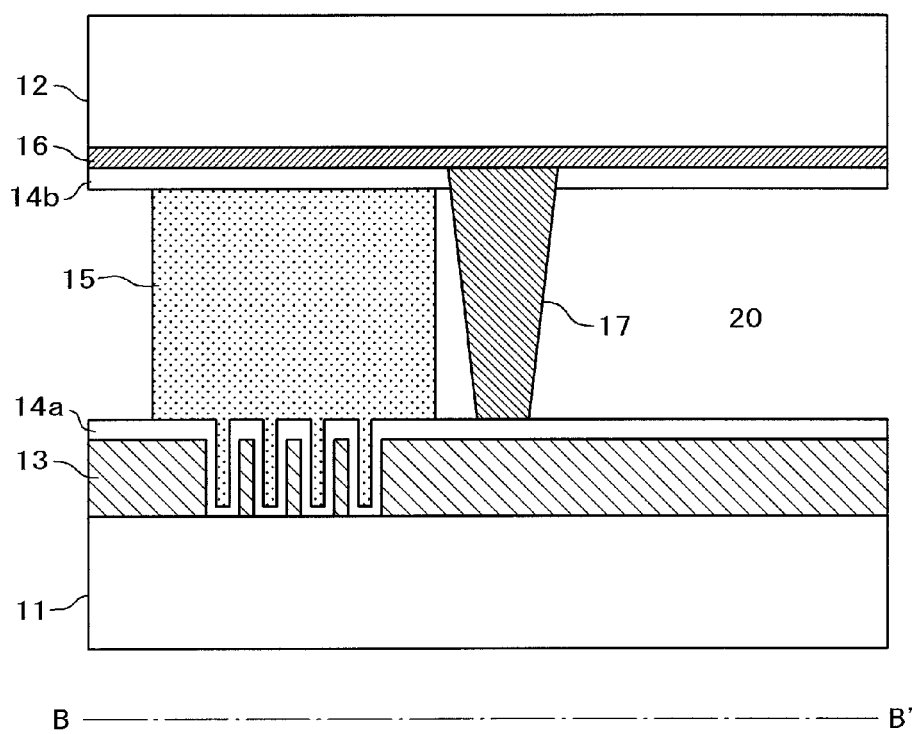
FIG. 5 is a cross sectional view illustrating a structure of a display panel according to a modified example 1.

FIG. 5 is a cross sectional view of a sealing area corresponding to the line B-B' indicated in FIG. 1, in the display panel according to the modified example 1.

A display panel PNLB according to the modified example 1 has the same structure as the example, except for the structure positioned under the sealing material 15 on the side of the array substrate 11. The flattening film 13 and the alignment film 14a are formed on the array substrate 11. Further, the light shielding layer (BM) 16, the alignment film 14b, and the columnar spacer 17 made of resin are formed on the counter substrate 12. The columnar spacer 17 has a trapezoidal cross section and is positioned in the inner side of the sealing material 15. The respective alignment films 14a and 14b of the array substrate 11 and the counter substrate 12 are bonded to each other by the sealing material 15, in order to interpose the liquid crystal layer 20 therebetween. The flattening film 13 is, for example, an organic insulating film.

As illustrated in FIG. 5, a plurality of slit shaped grooves (third groove and fourth groove) are formed in the flattening film 13 of the array substrate 11 positioned under the sealing material 15. The slit shaped groove (first groove) to be formed in the flattening film 13 may be one. The alignment film 14a is formed on the flattening film 13 and in the groove of the flattening film 13. When the sealing material 15 is filled in the groove and hardened, the adhesion area of the sealing material 15 with the alignment film 14a on the side of the array substrate can be increased and the peel strength can be improved.

Since the flattening film 13 has only to be formed in a pattern, there is no need to add another process, similarly to the example. Since the ultraviolet ray (UV light) in temporarily hardening the sealing material 15 does not arrive at the lateral surface of the alignment film 14a filled in the slit shaped groove, the intensity of the alignment film can be kept. Further, similarly to the example, since the alignment film 14a can be applied to the whole surface of the array substrate 11, there is no need to make a place where the alignment film 14a is not formed, in the whole area or a part of the sealing material 15, which can make the manufacturing easy, hence to cope with the miniaturization of the fringe portion.

MODIFIED EXAMPLE 2

A modified example (modified example 2) of the display panel according to the example will be described using FIG. 6.

Figure 6:
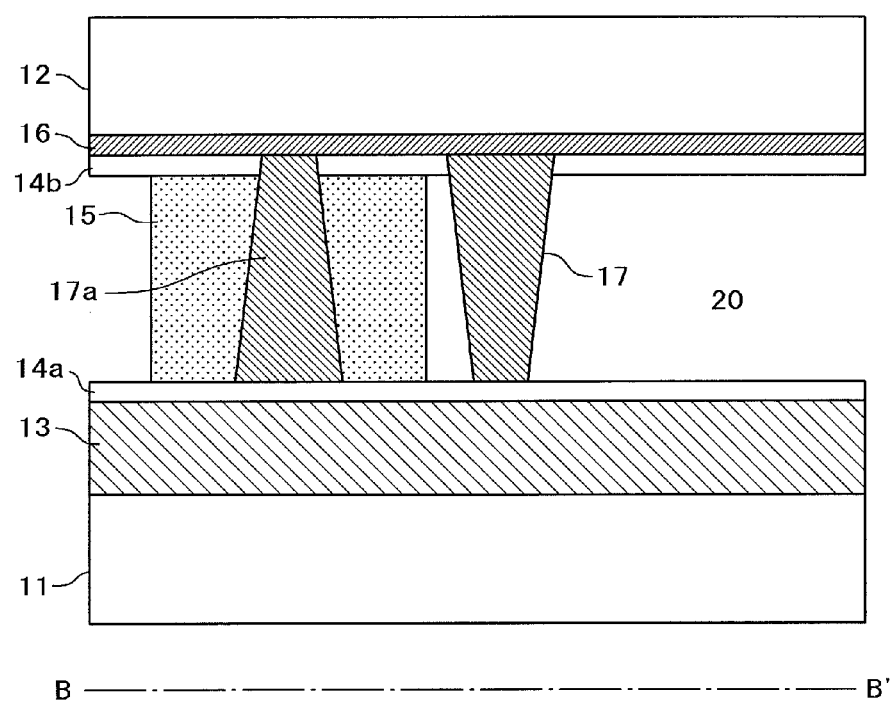
FIG. 6 is a cross sectional view illustrating a structure of a display panel according to a modified example 2.

FIG. 6 is a cross sectional view of a sealing area corresponding to the line B-B' indicated in FIG. 1, in the liquid crystal display panel according to the modified example 2.

The display panel PNLC according to the modified example 2 has the same structure as the comparison example, except for the structure on the side of the counter substrate 12 having the sealing material 15. The flattening film 13 and the alignment film 14a are formed on the array substrate 11. Further, the light shielding layer (BM) 16, the alignment film 14b, and the columnar spacer 17 made of resin are formed on the counter substrate 12. The columnar spacer 17 has a trapezoidal cross section and is arranged near the inside of the sealing material 15. The respective alignment films 14a and 14b of the array substrate 11 and the counter substrate 12 are bonded to each other by the sealing material 15 in order to interpose the liquid crystal layer 20 therebetween. The flattening film 13 is, for example, an organic insulating film.

As illustrated in FIG. 6, a columnar spacer 17a having an inverted trapezoidal cross section is arranged on the counter substrate 12 at a position corresponding to the sealing material 15, to increase the adhesion area of the sealing material 15, and the engagement of the sealing material 15 with the columnar spacer 17a can make the peeling hard. In other words, differently from the example and the modified example 1, the peel strength can be improved between the alignment film 14b and the sealing material 15 on the side of the counter substrate 12. The columnar spacer 17a does not have to have an inverted trapezoidal cross section like FIG. 6 but a spacer of any shape will do as far as the spacer is designed to have the width in the cross section on the side of the array substrate 11 larger than the width in the cross section on the side of the counter substrate 12 to increase the adhesion area with the sealing material 15 and to have an engagement portion with the sealing material 15. Further, since the alignment film 14b can be applied to the whole surface of the counter substrate 12, there is no need to make a place where the alignment film 14b is not formed, in the whole area or a part of the sealing material 15, which can make the manufacturing easy, hence to cope with the miniaturization of the fringe portion. The columnar spacer 17a also has a function of keeping the space between the array substrate 11 and the counter substrate 12, similarly to the columnar spacer 17.

By combining the modified example 2 with the example or the modified example 1, the adhesion area of the sealing material 15 with both the alignment film 14a on the side of the array substrate 11 and the alignment film 14b on the side of the counter substrate 12 can be increased and the peel strength can be improved.

What is claimed is:

1. A display device comprising:
an array substrate including a first alignment film;
a counter substrate including a second alignment film;
a liquid crystal layer in contact with the first alignment film and the second alignment film; and
a sealing material for bonding the first alignment film and the second alignment film together, wherein
the array substrate includes a flattening film under the first alignment film,
the flattening film includes a first groove and a second groove which is provided in connecting with a lower portion of the first groove and has a section with a width that is wider than the first groove in a direction of lateral surface of the first groove, and
the sealing material is filled in the first and second grooves.

2. The display device according to claim 1, wherein a light shielding film is provided on a lateral surface and a bottom surface of the second groove.

3. The display device according to claim 2,
wherein the first alignment film is formed on the light shielding film of the second groove of the flattening film.

4. The display device according to claim 1,
wherein the light shielding film on the lateral surface of the second groove is made of Al, and
the light shielding film on the bottom surface of the second groove is made of Ti.

5. The display device according to claim 4,
wherein the light shielding film on the lateral surface of the second groove is 100 nm to 500 nm.

6. The display device according to claim 4,
wherein the ration with distance d from the lateral surface of the first groove to the Al edge face of the shielding film of the second groove and thickness of h of the Al of the shielding film is 0.5<d/h<1.

7. The display device according to claim 1, wherein the first alignment film is subjected to rubbing orientation processing.

8. A display device comprising:
an array substrate including a first alignment film;
a counter substrate including a second alignment film;
a liquid crystal layer in contact with the first alignment film and the second alignment film;
a sealing material for bonding the first alignment film and the second alignment film together; and
a columnar spacer provided in the sealing material,
wherein the columnar spacer has such a cross sectional shape that a width on a side of the array substrate is larger than a width on a side of the counter substrate.

9. The display device according to claim 8, wherein the columnar spacer has an inverted trapezoidal cross section.

* * * * *